United States Patent [19]
Bronicki

[11] Patent Number: 5,448,889
[45] Date of Patent: Sep. 12, 1995

[54] METHOD OF AND APPARATUS FOR PRODUCING POWER USING COMPRESSED AIR

[75] Inventor: Lucien Y. Bronicki, Yavne, Israel

[73] Assignee: Ormat Inc., Sparks, Nev.

[21] Appl. No.: 183,232

[22] Filed: Jan. 19, 1994

Related U.S. Application Data

[63] Continuation of Ser. No. 22,390, Feb. 24, 1993, abandoned, which is a continuation of Ser. No. 825,777, Jan. 21, 1992, abandoned, which is a continuation of Ser. No. 406,524, Sep. 13, 1989, abandoned, which is a continuation of Ser. No. 246,149, Sep. 19, 1988, Pat. No. 4,942,736.

[30] Foreign Application Priority Data

Nov. 9, 1988 [IL] Israel ........................... 88334

[51] Int. Cl.6 .................................................. F03G 6/00
[52] U.S. Cl. ........................... 60/641.14; 60/641.15; 60/652; 60/659; 60/655; 60/676
[58] Field of Search ............ 60/641.8, 641.11, 641.12, 60/641.13, 641.14, 641.15, 650, 652, 659, 655, 664, 676, 682

[56] References Cited

U.S. PATENT DOCUMENTS

| | | | |
|---|---|---|---|
| 3,757,517 | 9/1973 | Rigollot | 60/39.18 R |
| 4,189,922 | 2/1980 | Bellofatto | 60/659 X |
| 4,222,373 | 9/1980 | Davis | 126/448 |
| 4,262,484 | 4/1981 | Jubb et al. | 60/659 X |
| 4,275,310 | 6/1981 | Summers et al. | 60/659 X |

(List continued on next page.)

FOREIGN PATENT DOCUMENTS

| | | |
|---|---|---|
| 0229373 | 7/1987 | European Pat. Off. |
| 2125680 | 9/1972 | France |
| 3428041 | 1/1986 | Germany |
| 105606 | 8/1979 | Japan ............... 60/641.14 |

(List continued on next page.)

OTHER PUBLICATIONS

Russian Application No. 2413-105070/541 RV, Dec. 2, 1994, with English Translation of Office Action.

R. Rimkevitch A. A. et al. "Control of Air Conditioning Systems", 1977 p. 211.

Translation of "Proceedings of the first Scientific and Technical Conference on Renewable Resources of Energy", by A. Davletov, D. Davletov, and Saryev, Published Moscow in 1972, pp. 166–175.

Russian Publication, "Proceedings of the First Scientific and Technical Conference on Renewable Resources of Energy"; A. Davletov, D. Davletoc, Saryev; Published Moscow 1972, pp. 166–175.

(List continued on next page.)

Primary Examiner—Stephen F. Husar
Attorney, Agent, or Firm—Sandler, Greenblum & Bernstein

[57] ABSTRACT

A method for producing power comprises compressing gas from an ambient source during a first period of time; storing the compressed gas in a storage reservoir; and supplying said compressed gas from the storage reservoir to a gas turbine during a second period of time to produce electric power. The first period of time may coincide with periods of off-peak demand for electricity, such as at night. In such case, the said second period of time is during the day. The compressed gas supplied to the gas turbine may be heated in a combustion chamber wherein fuel is burned, and/or a solar collector. The solar collector may comprise a receiver positioned at the top of a tower for receiving the compressed gas, and tracking reflectors for focusing solar on said receiver and heating the gas therein. The solar radiation receiver may comprise a rotatable ceramic member for transferring heat from solar radiation to the gas. A sensing/control unit may be provided which is responsive to the temperature of the gas exiting the solar receiver for effecting operation of the combustion chamber when the temperature of the gas falls below a predetermined value.

92 Claims, 4 Drawing Sheets

U.S. PATENT DOCUMENTS

| | | | |
|---|---|---|---|
| 4,403,601 | 9/1983 | Hunt | 126/435 |
| 4,581,897 | 4/1986 | Sankrithi | 60/641.15 X |
| 4,630,436 | 12/1986 | Frutschi | 60/39.183 |
| 4,765,142 | 8/1988 | Nakhamkin | 60/652 |
| 4,942,736 | 7/1990 | Bronicki | 60/655 X |

FOREIGN PATENT DOCUMENTS

| | | | |
|---|---|---|---|
| 148907 | 11/1980 | Japan | 60/655 |
| 7614124 | 6/1978 | Netherlands . | |
| 2006878 | 5/1979 | United Kingdom . | |
| 8102443 | 9/1981 | WIPO . | |

OTHER PUBLICATIONS

D. Weiner et al.; "Use of the Brayton Cycle in Solar Electric Power Generation", Presented at the Gas Turbine and Aeroengine Congress and Exposition–Jun. 4–6, 1989–Toronto, Canada.

R. Schainker; "Compression–Air Energy Storage (CAES): Overview, Performance, and Cost Data for 25MW to 220 MW Plants", IEEE Transactions on Power Apparatus and Systems, vol. PAS–104, No. 4, Apr. 1985.

R. Bons et al., "Predicting the Behavior of Solar Dynamic Closed Brayton Cycle Power Conversions Systems", Presented at the Gas Turbine and Aeroengine Congress and Exposition–Jun. 5–9, 1988–Amsterdam, The Netherlands.

"Eighty Atmospheres in Reserve", EPRI Journal, Palo Alto, Calif.–Apr. 1979.

"CAEScope", Compressed Air Energy Storage Newsletter, vol. 11, No. 2, 1988.

Hans–Christoph Herbst et al., "Huntorf 290 MW–The World's first Air Storage System Energy Transfer (Asset) Plant: Construction and Commissioning", American Power Conference, Chicago, Ill.–Apr. 24–26, 1978.

R. Ruzich et al., "Soyland–The First U.S. Air Storage Energy Transfer (Asset) Plant", Prepared for and Accepted by the American Power Conference, Chicago, Ill.–Apr. 18–20, 1983.

"Compressed–Air Energy Storage: An Analysis of Fuel Flexibility and Plant Components", BBC Brown Boveri, Inc., AP–5122–Research Project 1791–8, Final Report, May 1987.

Compressed Air Magazine, Jul., 1978, Compressed Air Storage–A Peak–Shaving Concept for Electrical Utilities.

Copy of a translation of an action from U.S.S.R. State for Inventions and Discoveries issued around Jun. 1990.

Brown Boveri Review, vol. 67, No. 12, Dec. 1980, pp. 723–733, entitled: "Air–Storage Power plants with special considerations of USA conditions".

FOCUSSED SOLAR
RADIATION RAYS

METHOD OF AND APPARATUS FOR PRODUCING POWER USING COMPRESSED AIR

This application is a continuation of application Ser. No. 08/022,390 filed Feb. 24, 1993, now abandoned, which is a continuation of application Ser. No. 07/825,777 filed Jan. 21, 1992, now abandoned, which is a continuation of application Ser. No. 07/406,524 filed Sep. 13, 1989 now abandoned, which is a continuation of application Ser. No. 07/246,149 filed Sep. 19, 1988, which issued as U.S. Pat. No. 4,942,736 on Jul. 24, 1990.

TECHNICAL FIELD

This invention relates to producing power using compressed air and more particularly is concerned with a method of and apparatus for producing power from compressed air using solar energy and a gas turbine.

BACKGROUND OF THE INVENTION

In recent years, domestic, commercial and industrial power consumption in many countries, particularly during the hours of peak power consumption, has been growing at a seemingly ever increasing rate. Because electric power utility companies are obligated to furnish power at levels sufficient to meet any customer requirement even if such levels occur infrequently or for only a few hours a day, the generating power capacity of the electric utility companies must be larger than the average power level requirements in order to provide the incremental power needed for periods of peak demand. Normally, and particularly in many countries in the summer time, peak power consumption occurs during several hours in the daytime, consumption levels falling to their so-called "off peak" levels during the night.

Electric utility companies conventionally operate generating plants having minimal costs and reasonably low operating costs, for example coal burning plants, to supply the base load and intermediate load of customers connected to the electric grid. Because peak power demands on electric utility companies occur only for relatively short periods of time, more expensive operating plants, such as gas turbines, which can be brought onto line quickly to furnish power are used during the short periods of peak demand. Consequently, the cost of peak power is normally several times larger than the cost of what is called baseload or "off-peak" power.

Recently, a system has been developed for providing peak power using a gas turbine wherein air necessary for the operation of the gas turbine is stored in underground caverns. At night, when relatively inexpensive power is available, an electrically driven air compressor is operated for compressing the air. During the day, when peak power is required, the compressed air is released from the caverns to the gas turbine for producing power via a coupled generator. In such a system, expensive caverns conventionally constructed underground are required to store the compressed gas.

It is therefore an object of the present invention to provide a new and improved method of and apparatus for producing electrical power during periods of peak power demand wherein the disadvantages as outlined including and related to the relatively large costs are reduced or substantially overcome.

SUMMARY OF THE INVENTION

A method according to the present invention for producing power comprises compressing gas preferably from an ambient source during a first period of time; storing the compressed gas in a storage reservoir; and supplying said compressed gas from the storage reservoir to a gas turbine during a second period of time to produce electric power. The first period of time may coincide with periods of off-peak demand for electricity, such as at night. In such case, the said second period of time is during the day.

The compressed gas supplied to the gas turbine may be heated in a combustion chamber wherein fuel is burned, and/or a solar collector. The solar collector may comprise a receiver positioned at the top of a tower for receiving the compressed gas, and tracking reflectors for focusing solar radiation on said receiver and heating the gas therein. The solar radiation receiver may comprise a rotatable ceramic member for transferring heat from solar radiation to the gas.

A sensing/control unit may be provided which is responsive to the temperature of the gas exiting the solar receiver for effecting operation of the combustion chamber when the temperature of the gas falls below a predetermined value.

Existing caverns, such as artificial salt caverns and underground aquifers can be used as storage reservoirs for storing the compressed gas. Underground caverns located in geological fields where oil wells exist, also can be used as storage reservoirs with existing oil wells and reservoirs such as dry and old ones etc., i.e., also the drilling itself reaching the reservoirs being preferably utilized in the present invention. By utilizing existing dry oil wells as the subsystem used in storing the compressed air necessary in operation of the gas turbine, in accordance with the present invention, considerable savings in construction costs are made, with the use of available solar energy to heat the compressed gas supplied to the gas turbine further cutting costs wherein the gas used in the gas turbine is compressed during period of relatively cheap off-peak electricity.

In the present invention, an electric motor is used to operate the compressors and the motor can be coupled, selectively, to the turbine and operates as an electric generator. In a preferred embodiment, the compressor is a multi-stage compressor and the gas turbine is a multi-stage turbine. Furthermore, heat generated during the compression of the gas and contained therein is transferred to another fluid in a heat exchanger which can be part of a waste heat converter for producing electrical power, the waste heat converter, preferably being an organic-fluid Rankine cycle power plant.

BREIF DESCRIPTION OF THE DRAWINGS

Embodiments of the invention are described below by way of example, and with reference to the accompanying drawings wherein.

DETAILED DESCRIPTION

Figure 1:
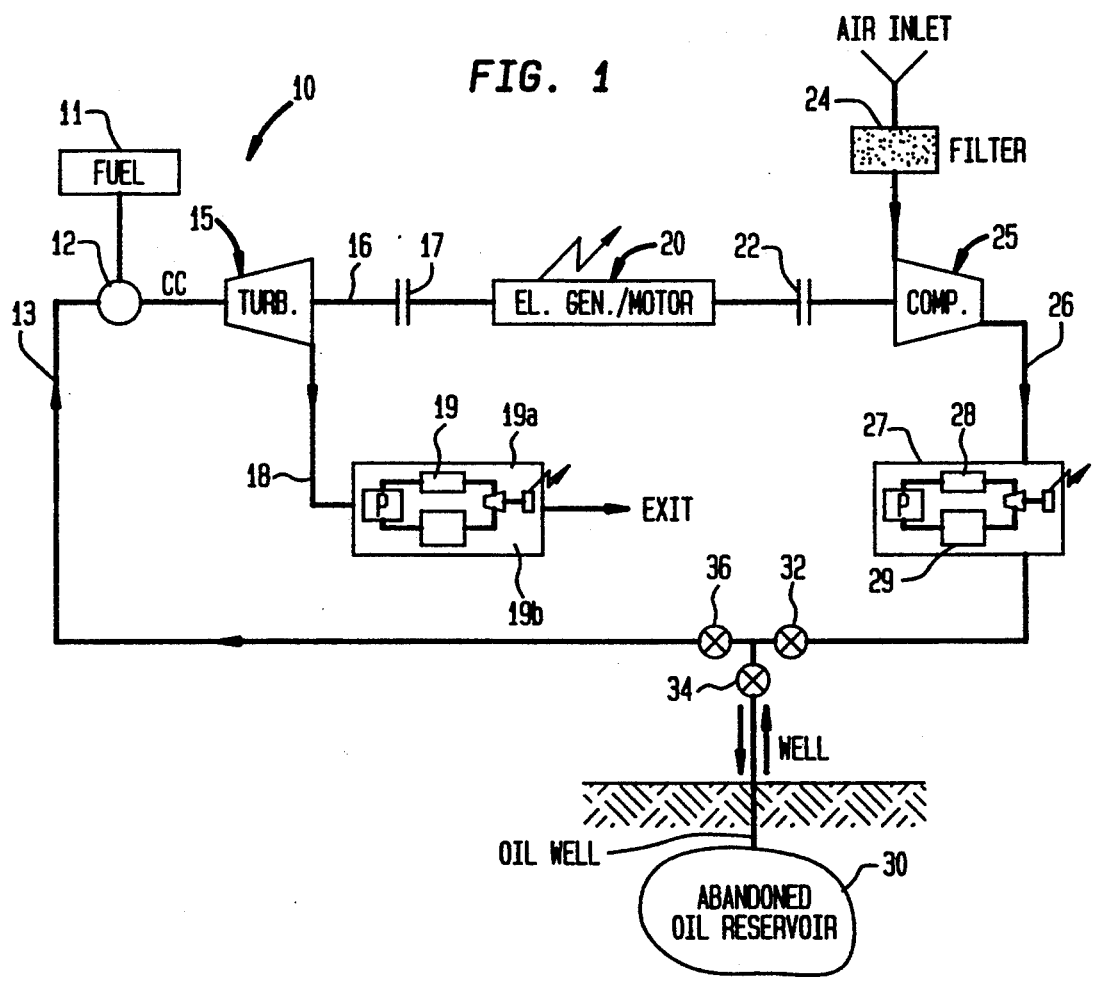
FIG. 1 is a block diagram of one embodiment of apparatus for producing power in accordance with the present invention.
Figure 1A:
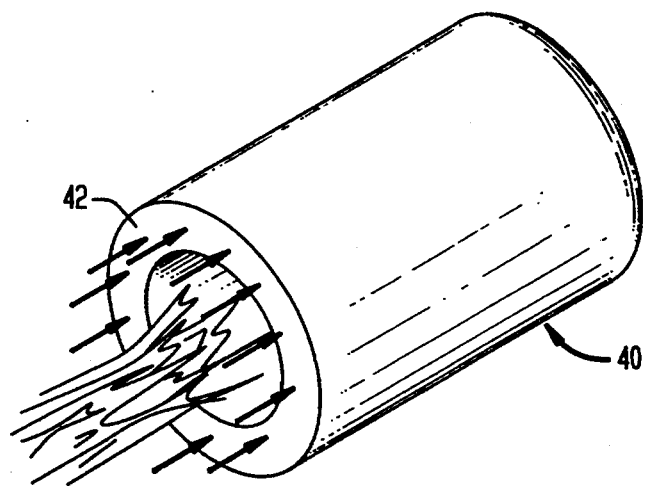
FIG. 1A shows a schematic diagram of the preferred embodiment of a combustion chamber of the present invention.

Referring to FIG. 1 of the drawings, reference numeral 10 designates apparatus for producing power in accordance with the present invention. Fuel tank 11 supplies fuel to combustion chamber 12, wherein compressed air from underground storage reservoir 30 is heated before entering gas turbine 15. The air stored in underground storage reservoir 30 is compressed during operation of compressor 25. The preferred form of the chamber is shown in FIG. 1A as external combustion chamber 40 wherein low grade fuel is burned to heat the compressed air flowing in annulus 42.

Existing caverns, such as artificial salt caverns and underground aquifers can be used as storage reservoirs for storing compressed air. Also, underground caverns located in geological fields where oil wells exist are suitable for use as storage reservoirs. Preferably, existing oil wells such as dry, old or abandoned ones, etc., are utilized in the present invention, wherein an oil reservoir connected to the oil well serves as the underground storage cavern for the compressed air with the well itself providing valuable access to the reservoir. In many cases, several oil wells may be connected to a single reservoir, and consequently, the blocking off of all except one well may be required in order to make the oil well and reservoir suitable for use in accordance with the present invention. Consequently, when such oil wells and reservoirs are used, construction costs are considerably cut.

When gas turbine 15 is in operation, it is coupled by clutch 17 to electric generator/motor 20 operating as an electric generator for producing electric power which is supplied to an electric grid (not shown). In this case, clutch 22 decouples generator/motor 20 from compressor 15. Optionally, a separate electric generator can be used, eliminating the need for clutches 17 and 22.

Exhaust 18 is provided for exhausting gases exiting turbine 15. Heat exchanger 28 may be provided to cool the air compressed by compressor 25 when generator/motor 20 is decoupled by clutch 17 from the gas turbine and operates as a motor coupled to the compressor by clutch 22. However, in an optional embodiment, heat exchanger 28 may be the vaporizer of waste heat converter 27, preferably comprising organic-fluid Rankine cycle (ORC) power plant 29. The vaporizer receives heat present in air compressed by compressor 25, with the waste heat converter produces electrical power during operation of compressor 25. Optionally, a heat exchanger 19 can be provided and connected to exhaust 18 for extracting heat from the gases exhausted from the gas turbine. This heat exchanger may also be part of waste heat converter 19a, preferably comprising organic-fluid Rankine cycle (ORC) power plant 19b which receives heat contained in the exhaust gases exiting turbine 15. Thus, the heat converter would produce electrical power during operation of the turbine.

When compressor 25 is operating, it is coupled by clutch 22 to electric generator/motor 20 which operates as a motor. Ambient air enters filter 24, is compressed by the compressor, and then stored in reservoir 30 when valves 32 and 34 are open and valve 36 is closed. Preferably, the air is compressed to a pressure of between 30 to 50 bar, such pressure being preferably maintained in the air storage reservoir. The compressor is operated during periods of off-peak demand for electricity in order to take advantage of the relatively inexpensive cost of electricity during such periods of time. Normally, such periods of time occur during the night and consequently electric generator/motor 20, acting as an electric motor running compressor 25, is made available at night.

Heat generated during compression of the air by compressor 25 is received by heat exchanger 28 and is preferably used to produce electric power via power plant 29. During the day, compressed air stored in storage reservoir 30 is released from the reservoir by opening valves 34 and 36, and closing valve 32. The released air flows toward turbine 15 through combustion chamber 12 where fuel supplied from fuel tank 11 heats the compressed air, normally to more than several hundred degrees centigrade. Expansion of the heated gases in turbine 15 causes the turbine to rotate output shaft 16 and drive electric generator/motor 20, now acting as an electric generator, which is coupled to the shaft via clutch 17. The electric power thus produced is supplied to an electric grid. During this mode of operation of electric generator/motor 20, clutch 22 disconnects the motor/generator from compressor 20.

Heat contained in the air or gases exiting gas turbine 15 via exhaust 18 is available for use by a heat exchanger which preferably may be part of a waste heat converter to produce electric power. Subsequently, the expended gas exits into the ambient atmosphere. Thus, electric power is produced during periods of peak power utilizing apparatus operating basically on a Brayton cycle, the compressed air used to run the gas turbine being compressed and stored preferably in abandoned oil reservoirs connected to abandoned oil wells during periods of off-peak demand for electricity, thus taking advantage of the relatively inexpensive cost of electricity during such periods.

Figure 2:
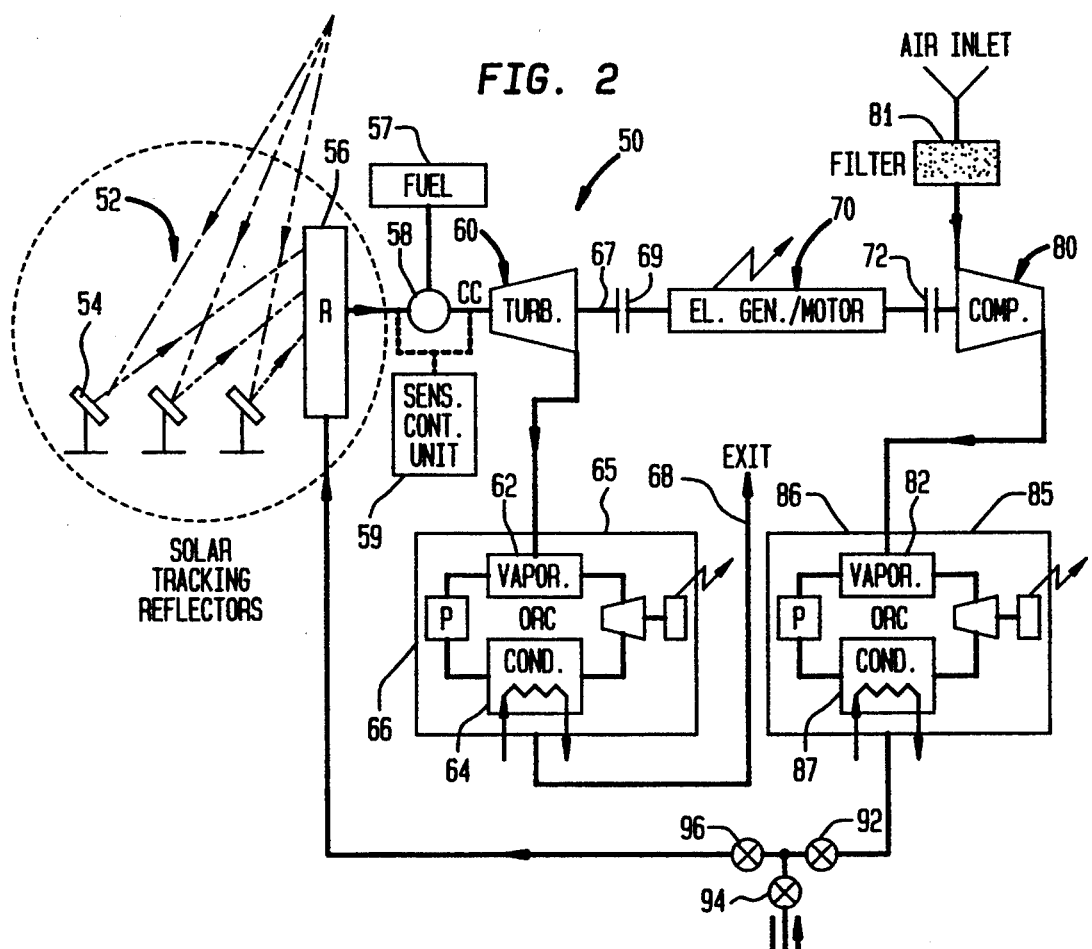
FIG. 2 is a block diagram of another embodiment of apparatus for producing power in accordance with the present invention.

Turning to FIG. 2 of the drawings, reference numeral 50 designates apparatus for producing power in accordance with another embodiment of the present invention. Solar collector 52 comprises tracking reflectors 54, or heliostats, for focusing solar radiation on solar radiation receiver 56 which receives compressed air supplied from underground storage reservoir 90. After being heated in receiver 56, the compressed air is supplied to gas turbine 60 which drives electric generator/motor 70 through clutch 69. In this mode, generator/motor 20 is decoupled by clutch 22 from compressor 80 and operates as an electric generator for producing electric power supplied to an electric grid (not shown). If preferred, however, a separate electric generator can be used.

Mirror reflectors can serve as tracking reflectors, and receiver 56 is normally positioned at the top of a tower. As in the previously described embodiment of the present invention shown in FIG. 1, existing caverns, such as artificial salt caverns and underground aquifers, can be used as storage reservoirs for storing compressed air. Also, quite often underground caverns located in geological fields where oil wells exist are suitable for use as storage reservoirs and many times existing oil wells, such as dry, old or abandoned ones etc., can also be utilized in the present invention, the oil reservoir connected to the oil well being used as the storage cavern.

Heat exchanger 62 contained in waste heat converter 65 receives heat present in air exhausted from turbine 60. Waste heat converter 65 produces electrical power from heat contained in the gases exhausted from gas turbine 60 in a manner similar to that described in the embodiment shown in FIG. 1. Preferably, waste heat converter 65 comprises organic-fluid Rankine cycle (ORC) power plant 66 containing vaporizer heat exchanger 62 and condenser 64 cooled by cooling water. Heat received in heat exchanger 62 vaporizes the working fluid of the power plant, the vaporized working fluid being furnished to a turbine for producing electric power. Subsequently, the expended air exits via exhaust conduit 68.

Figure 2A:
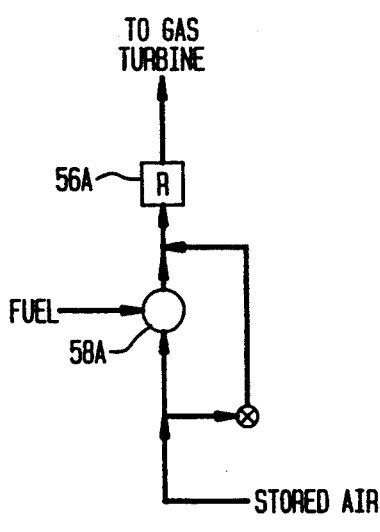
FIGS. 2A and 2B show modifications of certain components of the apparatus shown in FIG. 2.

Combustion chamber 58, run on fuel supplied from fuel supply 57 and located between receiver 56 and turbine 60, is provided for maintaining a preselected temperature of the air entering the gas turbine. Preferably, the operation of combustion chamber 58 is controlled by sensing/control unit 59 which senses the temperature of the air exiting receiver 56. When the temperature of the air exiting solar receiver 56 is sufficient, the air can flow directly to turbine 60 via suitable conduits, bypassing the combustion chamber. When unit 59 senses that the air exiting receiver 56 is below a preselected value, unit 59 directs the air, by way of suitably arranged valves and piping, into the combustion chamber and initiates operation of the combustion chamber by causing fuel to be burned therein at a rate that maintains the temperature of the air entering the gas turbine at its design value. Preferably, combustion chamber 58 is an external combustion chamber that uses low grade fuel to heat the air as shown in FIG. 1A. In order to ensure high combustion efficiency, the combustion chamber may be located before receiver 56 as shown in FIG. 2A.

Figure 2B:
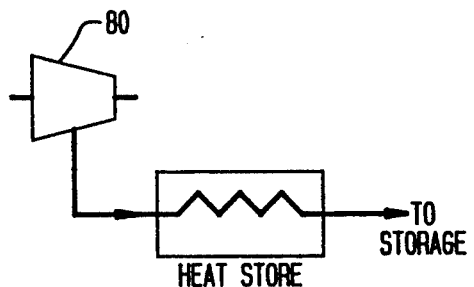

When clutch 72 is activated, clutch 69 is deactivated, and generator/motor 70 is operated as a motor, compressor 80 is driven by the motor and compresses ambient air supplied through filter 81. If preferred, a separate electric motor can be used to drive the compressor. Similar to the previously described embodiment, heat present in the air compressed by compressor 80 is extracted by heat exchanger 82 contained in waste heat converter 85 which extracts heat present in air compressed by compressor 80. The heat extracted from the compressed air by the waste heat converter during the operation of the compressor is utilized by the converter to generate electricity. Preferably, waste heat converter 85 comprises organic-fluid Rankine cycle (ORC) power plant 86 containing vaporizer heat exchanger 82, and condenser 84 cooled by cooling water. The heat received by heat exchanger 82 vaporizes the working fluid of the power plant, and the resultant vapors are supplied to a turbine in the power plant which drives a generator for producing electrical power. The expended vapors from the turbine are condensed by condenser 87 and returned to vaporizer 82. Alternatively, the heat extracted from the compressed air can be stored in a heat store for use at a later time as indicated in FIG. 2B. Examples of suitable heat stores are: a water reservoir, and the heat storage layer of a salt water solar pond.

In the present embodiment, solar receiver 56 may comprise a sealed container having pipes connected to the reservoir of compressed air and positioned at the focus of the tracking reflectors for receiving focused solar radiation which serves to heat the compressed air flowing through the pipes. The temperature in the pipes may reach 1000° C., and the pressure may reach 50 bar or even higher.

Figure 4:
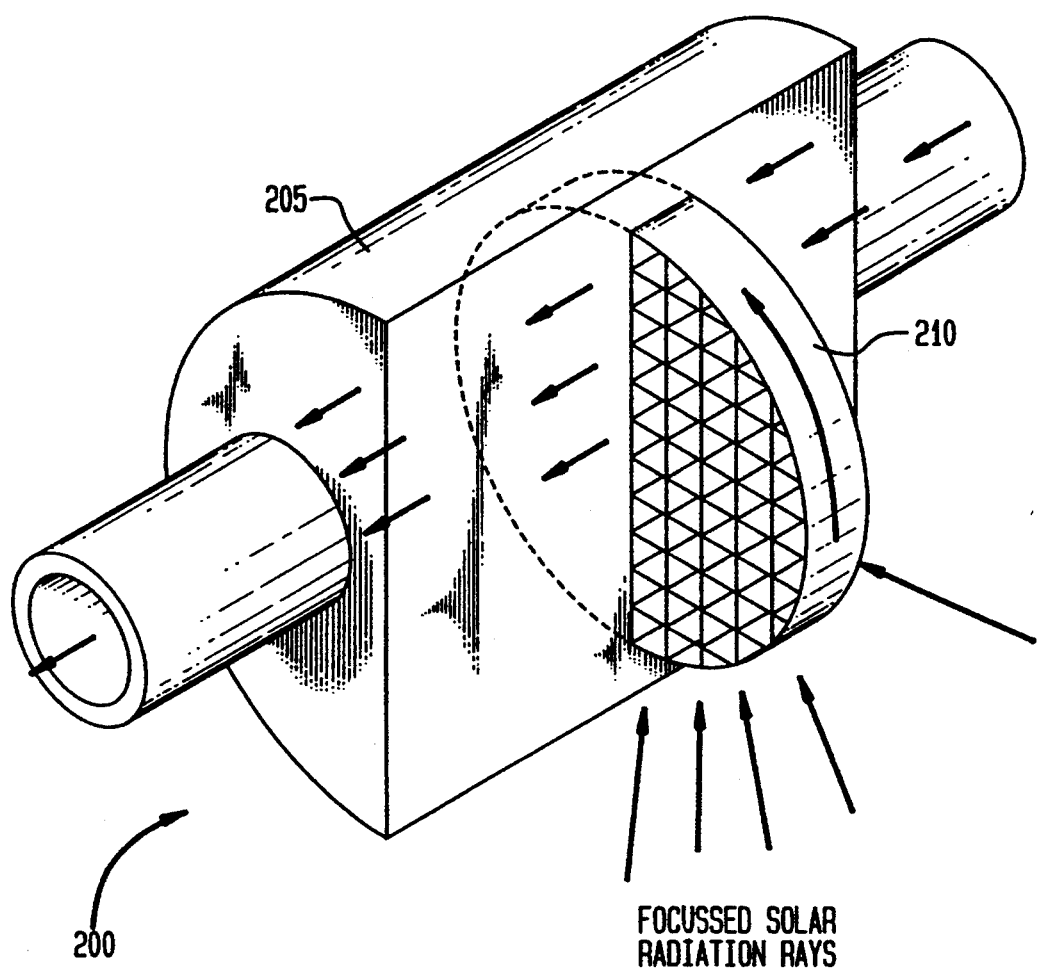
FIG. 4 shows a schematic diagram of the preferred embodiment of solar collector of the present invention.

The preferred form of the solar receiver is shown in FIG. 4 as receiver 200 which comprises sealed container 205 within which the compressed air flows in an axial direction, and member 210 rotatable relative to the container. A portion of member 210 extends external to the sealed container, and is located at the focus of the tracking reflectors for receiving the focused solar radiation. Rotation of member 210 moves the heated portion of member 210 internal to the sealed container where heat stored in such portion is transferred to the compressed air in the container. Thus, rotation of member 210 alternately subjects the member to focused heat, which is absorbed by the member, and to the flowing compressed air to which heat from the member is transferred.

In the preferred construction of member 210, ceramic material is used and the member has a matrix form. Also, the seals by which the rotatable member is sealed during its rotation are preferably cooled by gas or air this flow.

In operation of the embodiment of FIG. 2, compressor 80, driven by electric generator/motor 70 operated as a motor and coupled by clutch 72 to the compressor, compresses air supplied through filter 41. The compressed air is stored in reservoir 90 when valves 92 and 94 are open and valve 96 is closed. Preferably, the air is compressed to a pressure of between 30 to 50 bar; and such a pressure is also maintained in the air storage reservoir.

The compressor is operated during periods of off-peak demand for electricity in order to take advantage of the relatively inexpensive cost of electricity during such periods of time. Normally, such periods of time occur during the night and consequently electric generator/motor 70 is made available for use, acting as an electric motor running compressor 80.

Heat generated during compression and present in the compressed air is received by heat exchanger 82 and used to produce electric power via power plant 86. Alternatively, such heat can be stored in a heat sink for use at a later time.

In power plant 86, the heated air passes through heat exchanger 82 vaporizing an organic-working fluid, such as Freon or the like, the vapors being supplied to a turbine contained in power plant 86 for driving a generator and producing electric power. Vapors exhausted from this turbine are condensed in condenser 87 which is cooled by cooling water. A feed pump returns the condensed organic-fluid to vaporizer heat exchanger 82.

During the day, the compressed air stored in storage reservoir 90 is made available by opening valves 94 and 96 and closing valve 92. The compressed air flows toward turbine 60 through solar radiation receiver 56 where focused solar radiation reaching receiver 56 from tracking reflectors 54 heats the compressed air normally to more than several hundred degrees centigrade. The air that exits receiver 56 may have a temperature as high as 800° C. However, higher temperature can be obtained if required. Subsequently, the heated, compressed air may flow through combustion chamber 58 to gas turbine 60 where expansion takes place. Alternatively, the combustion chamber can be located upstream of the solar receiver. Regardless of the location of the combustion chamber relative to the solar receiver, only the air or gases currently being supplied to the turbine is heated by the burning fuel and solar radiation.

Expansion of the heated gases in turbine 60 causes the turbine to rotate shaft 67 driving electric generator/motor 70, now acting as an electric generator, and coupled thereto via clutch 69 producing electric power supplied to an electric grid. During this mode of operation, clutch 72 disconnects electric generator/motor 70 from compressor 80.

The temperature of the air exiting solar receiver 56 may drop below a preselected value due to, for example, the presence of cloud cover that reduces the amount of focused radiation reaching the receiver. In such case, sensing/control unit 59 senses the temperature drop of the air and brings combustion chamber 58 into operation in order to heat the air to maintain its temperature entering turbine 60. Heat remaining in the air or gases exiting gas turbine 60 is received by heat exchanger 62 and used to produce electric power via power plant 66 in a manner similar to that which takes place in power plant 86 described above. Subsequently, the expended gas exits via conduit 68.

As described above, solar energy is utilized to produce electric power using a gas turbine. Compressed air used to run the gas turbine is compressed and stored during periods of off-peak demand for electricity, thus taking advantage of the relatively inexpensive cost of electricity during such periods. Furthermore, quite often the periods of time during which electric power is produced by the gas turbine will coincide with periods of peak electric power demand.

Figure 3:
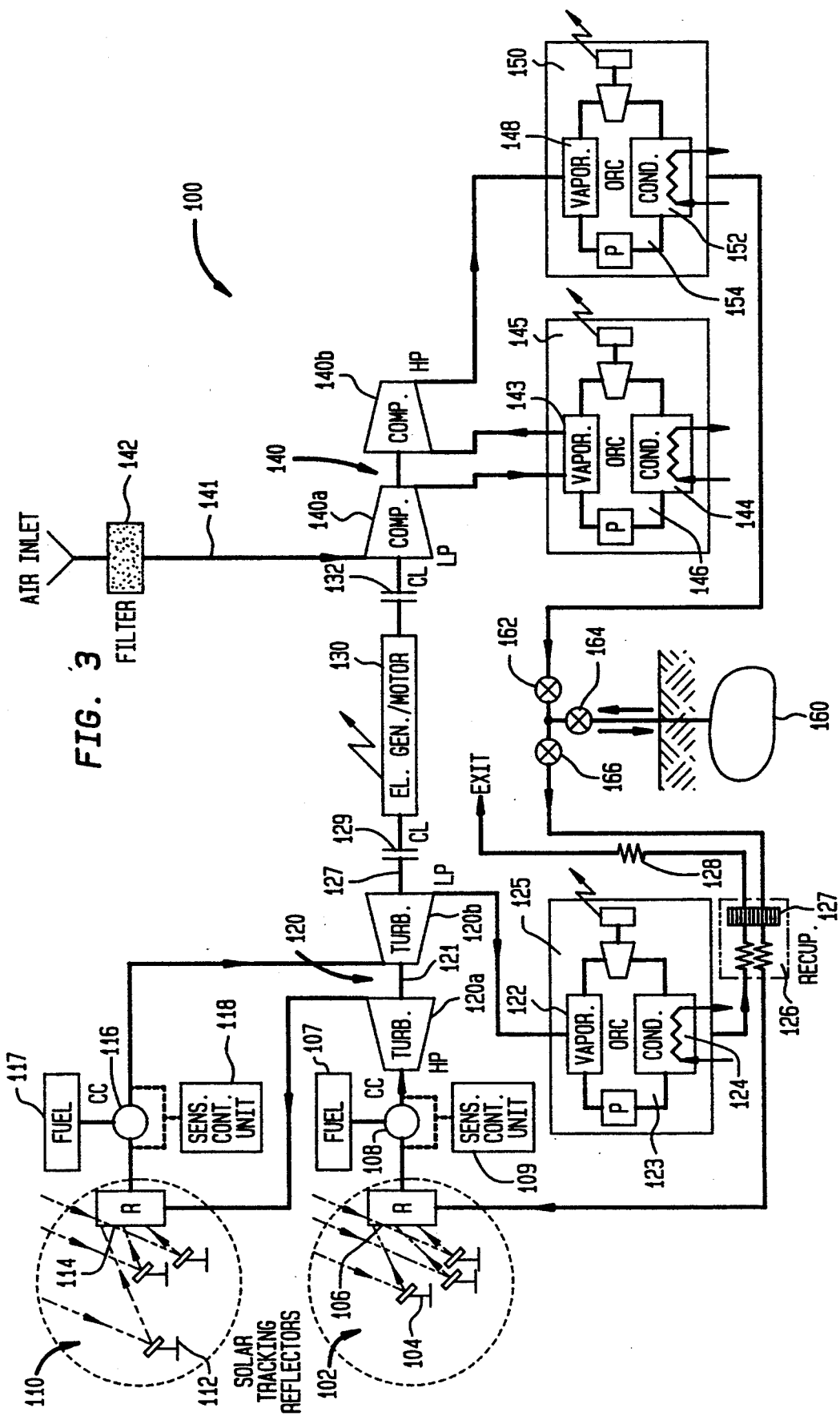
FIG. 3 shows a schematic diagram of a further embodiment of the present invention.

Referring now to FIG. 3, reference numeral 100 designates a further embodiment of the present invention for producing power from solar energy. This embodiment is similar to the embodiment shown in FIG. 2 except that gas turbine 120 and compressor 140 are multi-staged units. Second solar collector 110 and further waste heat converter 145 are provided between the stages of the turbine and compressor respectively in order to raise the efficiency of the power generating apparatus. Also, recuperator heat exchanger 126 is provided for additional heating of the compressed air supplied to gas turbine 120. While the gas turbine may have a generating capacity of 25 MW or greater, the present embodiment is also suitable for smaller generating capacities as well.

Solar collector 102 comprises tracking reflectors 104, or heliostats, for focusing solar radiation on solar radiation receiver 106 that receives the focused solar radiation. Collector 102 heats compressed air drawn from reservoir 160. The air in reservoir 160 had been compressed by compressor 140 during the previous nighttime operation of multi-stage compressor 140. During the next day, compressed air from reservoir 160 is supplied to multi-stage gas turbine 120 which drives electric generator/motor 130, operating as an electric generator through activated clutch 129, clutch 132 being deactivated at this time. Generator/motor 130 thus produces electric power which is supplied to an electric grid (not shown). If preferred, however, a separate electric generator and motor can be used.

As in the embodiment of FIG. 2, mirror reflectors can be used as tracking reflectors and receiver 106 is normally positioned at the top of a tower. Combustion chamber 108, which may be located between receiver 106 and turbine 120, or upstream of the receiver, maintains the desired temperature level of air entering the the gas turbine. Fuel supplied from fuel supply 107 is burned in the combustion chamber, the supply of fuel being controlled by sensing/control unit 109.

In the present embodiment, multi-stage gas turbine 120 comprises high pressure stage turbine 120a and low pressure stage turbine 120b. Multi-stage compressor 140, which comprises low pressure stage compressor 140a and high pressure compressor 140b, is driven by electric generator/motor 130 when the latter operates as an electric motor. If preferred, however, a separate electric motor can be provided to drive compressor 140.

Solar collector 110 comprises tracking reflectors 112, or heliostats, for focusing solar radiation, and solar radiation receiver 114 for receiving focused solar radiation. Collector 110 provides interstage reheating of the air or gas exiting high pressure stage turbine 120a. The reheated air is supplied to combustion chamber 116, which is operated by sensing/control unit 118. When necessary, fuel from fuel tank 117 is supplied to chamber 116 to maintain the temperature of the gases or air entering low pressure stage turbine 120b. In this manner, the efficiency of gas turbine 120 is improved.

Mirror reflectors can be used as tracking reflectors and receiver 114 is normally positioned at the top of a tower. Air or gases exiting receiver 114 flow through combustion chamber 116 to low pressure stage gas turbine 120b. Alternatively, gases can flow directly to turbines 120a and 120b from solar receivers 106 and 114 via suitable conduits, bypassing combustion chambers 108 and 116 when the temperature of the air or gas is sufficient. Optionally, the gases can be diverted so as to also flow through the combustion chambers by suitable piping and valve arrangements when the combustion chambers are brought into operation. Combustion chambers 108 and 116 are preferably external combustion chambers burning low grade fuel as shown in FIG. 1A. Optionally, the chambers may be positioned upstream of receivers 106 and 114 instead of downstream to ensure high combustion efficiency.

Heat exchanger 122, which is part of waste heat converter 125, utilizes heat contained in air or gases exiting low pressure stage turbine 120b for producing electrical power. As shown in FIG. 3, waste heat converter 125 preferably is in the form of an organic-fluid Rankine cycle (ORC) power plant 123 which comprises heat exchanger 122 that functions as a vaporizer for vaporizing the working fluid of the power plant. The vaporized working fluid is supplied to a turbine contained in the power plant for producing electrical power. Expended vapors exiting the turbine are condensed in condenser 124 which is cooled by cooling water.

Recuperator heat exchanger 126 is provided for utilizing residual heat remaining in air or gases leaving power plant 123 to preheat the compressed air supplied from storage reservoir 160 to solar receiver 106. Preferably, recuperator 126 comprises rotatable ceramic member 127 that is alternately heated by the air or gases leaving power plant 123, and cooled by the compressed air or gases drawn from reservoir 160. In this manner, the air or gases delivered to receiver 106 is preheated by the exhaust gases as member 127 rotates. Exhaust conduit 128 provides an exit for the expended air or gases to the ambient atmosphere.

In the present embodiment, inter-stage heat exchanger 143, which is part of waste heat converter 145, preferably is in the form of organic-fluid Rankine cycle power plant 146. This power plant comprises heat exchanger 143, which functions as a vaporizer, supplying vaporized working fluid to a turbine that produces electrical power from heat contained in compressed air exhausting from low pressure stage compressor 140a. In addition, waste heat converter 150, which includes heat exchanger 148 for receiving heat present in compressed air exiting high pressure stage compressor 140b is provided for producing electric power therefrom. Waste heat converter 150 preferably comprises an organic-fluid Rankine cycle power plant 154.

Solar receivers 106 and 114 in the present embodiment, like receiver 56 in the embodiment of FIG. 2, may comprise a sealed container having pipes positioned at the focus of the tracking reflectors for receiving focused solar radiation. The compressed air or gases flow through these pipes and is heated. Operating temperature in the pipes may reach 1000 deg. C., and operating pressure on the pipes may be 50 bar or even higher. However, operating temperatures and pressures of gases or air in receiver 114, positioned between the stages of the gas turbine 120 could be lower than these.

Preferably, solar receivers 106 and 114 comprise a rotatable member, a portion of which is positioned external to a sealed container at the focus of the tracking reflectors and is heated by the focused solar radiation. Another portion of the member is positioned internal to the sealed container and transfers heat to the compressed air or gases flowing past this portion in the manner shown in FIG. 4. As before, the member is preferably constructed from ceramic material a matrix form. Finally, the seals of the container are preferably cooled by gas or air flow.

When compressors 140a and 140b are driven by electric generator/motor 130 operating as a motor and clutch 132 is activated, the compressors compress the air to a pressure of between 30 to 50 bar before it is delivered to the reservoir. The compressed air is stored at similar pressure in reservoir 160 when valves 162 and 164 are open. In a manner similar to the previous embodiment, the compressors are operated during the periods of off-peak demand for electricity to take advantage of relatively inexpensive electricity during such periods of time. Normally, such periods of time occur during the night.

Heat generated during compression of the air by the compressors is received by heat exchangers 143 and 148 and is used to produce electric power using power plants 146 and 154 in a manner analogous to the manner of operation of power plants 66 and 86 contained in the previous embodiment shown in FIG. 2. During the day, stored compressed air is made available from storage reservoir 160 by opening valves 166 and 164, and closing valve 162. The compressed air flows into multistage turbine 120 through recuperator heat exchanger 126 and through solar radiation receiver 106 where focused solar radiation reaching receiver 106 from tracking reflectors 104 heats the compressed air. Normally, the air is heated to more than several hundred degrees centigrade, the gases reaching a temperature as high as 800 deg. C. If necessary, however, also in the present embodiment, higher temperatures can be used.

The heated compressed air flows from receiver 106 through combustion chamber 108 reaching high pressure stage turbine 120a where expansion takes place. Expanded gases exhausted from turbine 120a flow through receiver 114 and combustion chamber 116 where the gases are heated once again to relatively high temperatures of several hundred degrees. Subsequently, the heated gases are supplied to low pressure stage turbine 120b where expansion occurs once again. Expansion of the gases in turbines 120a and 120b cause the turbines to drive shaft 121 and shaft 127 respectively. These shafts are coupled by clutch 129 to electric generator/motor 130, now acting as an electric generator, which produces electric power. During this operation, clutch 132 is activated, and generator/motor 130 is disconnected from compressor 140. If the temperature of the air or gases exiting either solar receivers 106 and 114 drops below a preselected value, sensing/control units 109 and 118 sense the temperature drop and brings either one of the other or both of combustion chambers 108 and 116 into operation for maintaining the temperature of gases or air entering turbines 120a and 120b.

Gases exiting low pressure stage turbine 120b flow to heat exchanger 122 of organic-fluid Rankine Cycle power plan 123 where heat contained therein is used to vaporize the working fluid of this power plant, such as Freon etc., the vapors being supplied to the power plant turbine to produce electric power by driving a generator. Vapors exciting the power plant turbine are condensed in condenser 124 cooled by cooling water. A feed pump returns the condensed organic-fluid to heat exchanger 122. Further heat contained in gases or air exiting power plant 123 is used in recuperator 126 to heat compressed air flowing from air reservoir 160 to receiver 106. Expended gases are exhausted from apparatus 100 via exhaust conduit 128.

The advantages and improved results furnished by the method and apparatus of the present invention are apparent from the foregoing description of the embodiments of the invention. Various changes and modifications may be made without departing from the spirit and the scope of the invention as described in the claims that follow.

I claim:

1. A method for producing power comprising the steps of: compressing gas from an ambient source during a first period of time; storing the compressed gas in a storage reservoir; and supplying said compressed gas from the storage reservoir to a gas turbine during a second period of time to produce electric power wherein the compressed gas is supplied to the gas turbine through a solar collector interposed between the reservoir and the turbine for heating the compressed gas.

2. The method according to claim 1 wherein the compressed gas supplied to the gas turbine is heated in a combustion chamber wherein fuel is burned.

3. The method according to claim 2 wherein said solar collector comprises a receiver positioned at the top of a tower for receiving the compressed gas, and tracking reflectors for focusing solar radiation on said receiver for heating the gas therein.

4. The method according to claim 3 further comprising the step of commencing operation of said combustion chamber in response to sensing a fall in temperature of the gas exiting the solar receiver below a predetermined value.

5. A method for producing power comprising the steps of: compressing gas from an ambient source during a first period of time; storing the compressed gas in a storage reservoir; supplying said compressed gas from the storage reservoir to a gas turbine coupled to a generator during a second period of time to produce electric power; and cooling the compressed gas prior to storing it by transferring heat present in the compressed gas to another fluid in a heat exchanger; and further comprising producing electric power using heat transferred to the other fluid in said heat exchanger, said heat exchanger being part of a waste heat converter separate from said generator.

6. The method according to claim 5 wherein said heat supplied to the other fluid vaporizes the fluid, the vapors being supplied to a turbine contained in said waste heat converter to produce electric power, said waste heat converter being an organic-fluid Rankine cycle power plant.

7. Apparatus for producing power using compressed gas and a gas turbine comprising: compressor means for compressing said gas; a storage reservoir for storing gas compressed by said compressor means; means for supplying compressed gas from said reservoir to the gas turbine; and a solar collector interposed between said reservoir and said turbine for heating the gas supplied to said turbine through said solar collector.

8. Apparatus according to claim 7 further comprising a heat exchanger for cooling the air compressed by said compressor means before the air is stored in said storage reservoir.

9. Apparatus according to claim 7 further comprising a heat exchanger for cooling gases exiting said gas turbine.

10. Apparatus according to claim 7 including means for operating said compressor means during a first period of time which includes periods of offpeak demand for electricity.

11. Apparatus according to claim 10 wherein said first period of time is during the night.

12. Apparatus according to claim 10 further comprising an electric motor for driving said compressor.

13. Apparatus according to claim 12 wherein said electric motor operates as an electric generator when driven by the gas turbine during the second period of time.

14. Apparatus according to claim 7 wherein said solar collector comprises a receiver positioned at the top of a tower for receiving the compressed gas, and tracking reflectors for focusing solar on said receiver and heating the gas therein.

15. Apparatus according to claim 14 wherein said means for heating the gas further comprises a combustion chamber for heating gas supplied to the gas turbine.

16. Apparatus according to claim 15 wherein the solar collector and combustion chamber are arranged such that the gas flowing to said gas turbine first passes through the solar receiver and said combustion chamber.

17. Apparatus according to claim 16 wherein said combustion chamber is upstream of the solar collector.

18. Apparatus according to claim 16 further comprising a sensing/control unit responsive to the temperature of the gas exiting the solar collector for effecting operation of the combustion chamber when the temperature of the gas falls below a predetermined value.

19. Apparatus according to claim 18 wherein said gas turbine is a multi-stage turbine having a high pressure stage and a low pressure stage.

20. Apparatus according to claim 19 further comprising a second solar collector and second combustion chamber for heating gas exiting said high pressure stage prior to entering said low pressure stage of multi-stage turbine.

21. Apparatus according to claim 20 wherein said second solar collector comprises a receiver positioned at the top of a tower for receiving the compressed gas from the reservoir, and tracking reflectors for focusing solar radiation on said receiver and heating the gas therein.

22. Apparatus according to claim 20 wherein said storage reservoir is an abandoned oil reservoir and said means for supplying compressed gas to said gas turbine include an abandoned oil well for supplying gas from storage reservoir to the gas turbine through the receiver.

23. Apparatus according to claim 15 wherein said combustion chamber is an extenal combustion chamber operating on low grade fuel.

24. Apparatus according to claim 20 wherein said combustion chambers are external combustion chamber operating on low grade fuel.

25. Apparatus according to claim 7 wherein said compressor means is a multi-stage compressor.

26. Apparatus according to claim 7 wherein said gas is air.

27. Apparatus according to claim 7 wherein said means for heating the gas includes an external combustion chamber operating on low grade fuel.

28. Apparatus for producing power using compressed gas and a gas turbine for driving an electric generator comprising: compressor means for compressing said gas during a first period of time; a storage reservoir for storing air compressed by said compressor means; means for supplying compressed gas to the gas turbine during a second period of time to produce power; means for heating the gas supplied to said turbine; and further comprising a heat exchanger for cooling the gas compressed by said compressor means before the gas is stored in said storage reservoir, wherein said heat exchanger is part of a waste heat converter separate from said generator for producing electrical power.

29. Apparatus according to claim 28 wherein said waste heat converter is an organic-fluid Rankine Cycle power plant and, said heat exchanger is a vaporizer for vaporizing the organic working fluid of the organic-fluid Rankine cycle power plant.

30. Apparatus for producing power using compressed gas and a gas turbine for driving an electric generator comprising: compressor means for compressing said gas during a first period of time; a storage reservoir for storing gas compressed by said compressor means; means for supplying compressed gas from said reservoir to the gas turbine during a second period of time to produce power; means for heating the gas supplied to said turbine; and further comprising a heat exchanger for cooling gases exiting said gas turbine; wherein said heat exchanger is part of a waste heat converter separate from said generator for producing electrical power, and wherein said waste heat converter is an organic fluid Rankine cycle power plant and said heat exchanger is a vaporizer for vaporizing the organic working fluid of the Rankine cycle power plant.

31. Apparatus according to claim 30 wherein said storage reservoir is an abandoned oil reservoir.

32. Apparatus for producing power using compressed gas and a gas turbine for driving an electric generator comprising: compressor means for compressing gas during a first period of time; a storage reservoir for storing gas compressed by said compressor means; means for supplying compressed gas to the gas turbine during a second period of time to produce power; and means for heating the gas supplied to said turbine, said means for heating the gas including a solar collector, and further comprising a heat exchanger for cooling the compressed gas.

33. Apparatus according to claim 32 wherein said heat exchanger is part of a waste heat converter for producing electrical power.

34. Apparatus according to claim 33 wherein said waste heat converter is an organic-fluid Rankine cycle power plant and said heat exchanger is a vaporizer for vaporizing the organic working fluid of the Rankine cycle power plant.

35. Apparatus for producing power using compressed gas and a gas turbine for driving an electric generator comprising: compressor means for compressing said gas during a first period of time; a storage reservoir for storing gas compressed by said compressor means; means for supplying compressed gas to the gas turbine during a second period of time to produce power; and means for heating the gas supplied to said turbine, said means for heating the gas including a solar collector, and wherein said solar collector comprises a rotatable ceramic member for transferring heat from solar radiation to the gas.

36. Apparatus for producing power using compressed gas and a gas turbine for driving an electric generator comprising: compressor means for compressing said gas during a first period of time; a storage reservoir for storing gas compressed by said compressor means; means for supplying compressed gas to the gas turbine during a second period of time to produce power; and means for heating the gas supplied to said turbine, said means for heating the gas including a solar collector, and wherein said storage reservoir is an abandoned oil reservoir and said means for supplying compressed gas to said gas turbine include an abandoned oil well for supplying gas from the storage reservoir to the turbine through the solar collector.

37. Apparatus for producing power using compressed gas and a gas turbine for driving an electric generator comprising: compressor means for compressing said gas; a storage reservoir for storing gas compressed by said compressor means; means for supplying compressed gas from said reservoir to the gas turbine to produce power; means for heating the gas supplied to said turbine; a heat exchanger for extracting heat from gases exiting said gas turbine; and means for converting heat extracted by the heat exchanger to work by transferring the extracted heat to an organic fluid.

38. Apparatus for producing power using compressed gas and a gas turbine for driving an electric generator comprising: compressor means for compressing said gas; a storage reservoir for storing air compressed by said compressor means; means for supplying compressed gas to the gas turbine to produce power; means for heating the gas supplied to said turbine; a heat exchanger for extracting heat from the gas compressed by said compressor means before the gas is stored in said storage reservoir, and means for converting heat extracted by the heat exchanger to work.

39. Apparatus according to claim 38 wherein said heat exchanger is part of a waste heat converter that constitutes an organic fluid Rankine cycle power plant and said heat exchanger serves to vaporize the organic working fluid of the Rankine cycle power plant.

40. Apparatus according to claim 38 comprising a further heat exchanger for extracting heat from gases exiting said gas turbine, and means for converting heat extracted by said further heat exchanger to work.

41. Apparatus according to claim 40 wherein said means for converting heat is a further organic fluid Rankine cycle power plant, and said further heat exchanger is a vaporizer for vaporizing the organic working fluid of said further Rankine cycle power plant.

42. Apparatus according to claim 38 including means for operating said compressor means during a first period of time which includes periods of off-peak demand for electricity.

43. Apparatus according to claim 42 wherein said first period of time is during the night.

44. Apparatus according to claim 42 including means for supplying said compressed gas from said storage reservoir to said gas turbine during a second period of time which includes periods of peak demand for electricity.

45. Apparatus according to claim 44 wherein said second period of time is during the day.

46. Apparatus according to claim 38 wherein said means for heating the gas comprises a solar collector.

47. Apparatus according to claim 46 wherein said solar collector is interposed between the reservoir and the turbine for heating the compressed gas before it supplied to the turbine.

48. Apparatus according to claim 47 wherein said solar collector comprises a receiver positioned at the top of a tower for receiving the compressed gas, and tracking reflectors for focusing solar radiation on said receiver for heating the gas therein.

49. Apparatus according to claim 47 wherein said means for heating the gas further comprises a combustion chamber for heating gas supplied to the gas turbine when the chamber is operated.

50. Apparatus according to claim 49 wherein said combustion chamber is an external combustion chamber operating on low grade fuel.

51. Apparatus according to claim 49 wherein the solar collector and combustion chamber are arranged such that the gas flowing to said gas turbine first passes through the solar receiver and then said combustion chamber.

52. Apparatus according to claim 49 wherein said combination chamber is upstream of the solar collector.

53. Apparatus according to claim 49 further comprising a sensing/control unit responsive to the temperature of the gas exiting the solar collector for effecting operation of the combustion chamber when the temperature of the gas falls below a predetermined value.

54. Apparatus according to claim 38 wherein said gas turbine is a multi-stage turbine having a high pressure stage and a low pressure stage.

55. Apparatus according to claim 54 further comprising a second solar collector and second combustion chamber for heating gas exiting said high pressure stage prior to entering said low pressure stage of the multi-stage turbine.

56. Apparatus according to claim 55 wherein said second solar collector comprises a receiver positioned at the top of a tower for receiving the compressed gas from the reservoir, and tracking reflectors for focusing solar radiation on said receiver and heating the gas therein.

57. Apparatus according to claim 42 wherein said electric motor operates as an electric generator when driven by the gas turbine during the second period of time.

58. Apparatus according to claim 38 wherein said compressor means is a multi-stage compressor having a high pressure stage and a low pressure stage.

59. Apparatus according to claim 58 wherein said waste heat converter operates on heat generated during compression in said low pressure stage of the multi-stage compressor.

60. Apparatus according to claim 59 wherein said waste heat converter is part of an organic fluid Rankine cycle power plant and said heat exchanger serves to vaporize the organic working fluid of the Rankine cycle power plant.

61. Apparatus according to claim 60 wherein said waste heat converter operates on heat generated during compression in said low pressure stage of the multi-stage compressor.

62. Apparatus according to claim 47 wherein said solar collector comprises a rotatable ceramic member for transferring heat from solar radiation to the gas.

63. Apparatus according to claim 38 wherein said gas is air.

64. Apparatus apparatus according to claim 38 wherein said storage reservoir is an abandoned oil reservoir and said means for supplying compressed gas to said gas turbine include an abandoned oil wall for supplying gas from the storage reservoir to the gas turbine through a solar collector.

65. Apparatus for producing power using compressed gas and a gas turbine for driving an electric generator comprising: compressor means for compressing said gas during a first period of time; a storage reservoir for storing gas compressed by said compressor means; means for supplying compressed gas from said reservoir to the gas turbine during a second period of time to produce power; means for heating the gas supplied to said turbine, said means including a solar collector; a heat exchanger for extracting heat from gases exiting said gas turbine and transferring heat extracted from the gases to an organic fluid, and means for converting heat transferred to the organic fluid to work.

66. Apparatus according to claim 65 wherein said means for converting heat transferred to the organic fluid to work comprises a waste heat converter for producing power.

67. Apparatus according to claim 66 wherein said waste heat converter comprises an organic-fluid Rankine cycle power plant, and said heat exchanger is a vaporizer for vaporizing the organic working fluid of the organic-fluid Rankine cycle power plant.

68. Apparatus according to claim 65 wherein said compressor means for compressing said gas during a first period of time includes means for operating said compressor means during a first period of time which includes periods of off-peak demand for electricity.

69. Apparatus according to claim 65 wherein said means for supplying compressed gas from said reservoir to the gas turbine during a second period of time to produce power includes means for supplying said compressed gas from said storage reservoir to said gas turbine during a second period of time which includes periods of peak demand of electricity.

70. Apparatus according to claim 68 wherein said first period of time is during the night.

71. Apparatus according to claim 69 wherein said second period of time is during the day.

72. Apparatus for producing power using compressed gas and a gas turbine for driving an electric generator comprising: compressor means for compressing said gas; a storage reservoir for storing gas compressed by said compressor means; means for supplying compressed gas from said reservoir to the gas turbine to produce power; means for heating the gas supplied to said turbine, said means including a solar collector; a heat exchanger for extracting heat from gases exiting said gas turbine and transferring heat extracted form the gases to an organic fluid; and means for converting heat transferred to the organic fluid to work.

73. Apparatus according to claim 72 wherein said means for converting heat transferred to the organic fluid to work comprises a waste heat converter for producing power.

74. Apparatus according to claim 73 wherein said waste heat converter comprises an organic-fluid Rankine cycle power plant, and said heat exchanger is a vaporizer for vaporizing the organic working fluid of the organic-fluid Rankine Cycle power plant.

75. Apparatus according to claim 72 including means for operating said compressor means during a first period of time which includes periods of off-peak demand for electricity.

76. Apparatus according to claim 72 including means for supplying said compressed gas from said storage reservoir to said gas turbine during a second period of time which includes period of peak demand of electricity.

77. Apparatus according to claim 75 wherein said first period of time is during the night.

78. Apparatus according to claim 77 wherein said second period of time is during the day.

79. A method for producing power comprising the steps of:
   a) compressing gas from an ambient source;
   b) supplying said compressed gas to a gas turbine to produce electric power;
   c) passing the compressed gas through a solar collector located upstream of the gas turbine for heating the gas;
   d) sensing the temperature of the gas exiting the collector;
   e) selectively heating the compressed gas downstream of the collector before the heated gas is supplied to the gas turbine in accordance with the sensed temperature.

80. A method according to claim 79 wherein solar heat is transferred to the gas by a ceramic member which receives solar radiation and which is rotatable into and out of the gas.

81. Apparatus for producing power using compressed air and a gas turbine for driving an electric generator comprising:
   a) a compressor for compressing air;
   b) a storage reservoir for storing air compressed by said compressor;
   c) means for supplying compressed air from the reservoir to a solar heater for heating said gas;
   d) a conduit connecting the solar heater to the gas turbine;
   e) a sensing/control unit for sensing the temperature of the air that exits the solar heater and maintaining air flow through said conduit only when the temperature of the air that exits the solar heater is above a predetermined value; and
   f) a combustion chamber for receiving and heating air from the solar heater before the air is supplied to the gas turbine, said sensing/control unit being effective to switch air flow from said conduit to said combustion chamber and to supply fuel to the combustion chamber only when the temperature of the air that exits the solar heater falls below said predetermined value.

82. Apparatus according to claim 81 including a heat exchanger for cooling the air compressed by said compressor before the air is stored in said storage reservoir.

83. Apparatus according to claim 82 wherein the heat exchanger is part of a waste heat converter for producing electrical power.

84. Apparatus according to claim 83 wherein said waste heat converter is an organic-fluid Rankine Cycle power plant and, said heat exchanger is a vaporizer for vaporizing the organic working fluid of the organic-fluid Rankine cycle power plant.

85. Apparatus according to claim 84 including a further heat exchanger for cooling gases exiting said gas turbine.

86. Apparatus according to claim 85 wherein said further heat exchanger is part of a waste heat converter for producing electrical power.

87. Apparatus according to claim 86 wherein said further waste heat converter is an organic-fluid Rankine cycle power plant and said further heat exchanger is a vaporizer for vaporizing the organic working fluid of the Rankine cycle power plant.

88. Apparatus according to claim 81 wherein said solar radiation receiver comprises a rotatable ceramic member for transferring heat from solar radiation to the gas.

89. Apparatus according to claim 81 wherein said gas turbine is a multi-stage turbine having a high pressure stage and a low pressure stage.

90. Apparatus according to claim 89 including a second solar collector and second combustion chamber for heating gas exiting said high pressure stage prior to entering said low pressure stage of multi-stage turbine.

91. Apparatus according to claim 90 wherein said second solar collector comprises a receiver positioned at the top of a tower for receiving the compressed gas from the reservoir, and tracking reflectors for focusing solar radiation on said receiver and heating the gas therein.

92. A method for producing power using compressed air and a gas turbine for driving an electric generator comprising:
   a) compressing air;
   b) storing the compressed air in a reservoir;
   c) heating compressed air from the reservoir in a solar heater;
   d) supplying air heated by the solar heater to the gas turbine;
   e) sensing the temperature of the air after it is heated in the solar heater;
   f) effecting the flow of air from the solar heater directly to the gas turbine only when the temperature of the air heated by the solar heater is above a predetermined value; and
   g) selectively switching the air flow into a combustion chamber where the air from the solar heater is heated by burning fuel before being supplied to the gas turbine, said switching occuring only when the temperature of the air heated by the solar heater falls below said predetermined value.

* * * * *